(12) United States Patent
Shibata et al.

(10) Patent No.: US 10,612,607 B2
(45) Date of Patent: Apr. 7, 2020

(54) ENGAGING DEVICE

(71) Applicant: TOYOTA JIDOSHA KABUSHIKI KAISHA, Toyota-shi, Aichi-ken (JP)

(72) Inventors: Hiroyuki Shibata, Odawara (JP); Hiroyuki Shioiri, Yokohama (JP); Mitsuaki Tomita, Susono (JP); Shotaro Kato, Sunto-gun (JP); Yuki Kurosaki, Yamato (JP); Hiroyuki Ogawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/209,264

(22) Filed: Dec. 4, 2018

(65) Prior Publication Data

US 2019/0211890 A1 Jul. 11, 2019

(30) Foreign Application Priority Data

Jan. 9, 2018 (JP) .................................. 2018-001384

(51) Int. Cl.
*F16D 41/06* (2006.01)
*F16D 41/16* (2006.01)
(52) U.S. Cl.
CPC ............. *F16D 41/06* (2013.01); *F16D 41/16* (2013.01); *F16D 2041/0603* (2013.01)

(58) Field of Classification Search
None
See application file for complete search history.

(56) References Cited

U.S. PATENT DOCUMENTS

| 6,373,157 B1* | 4/2002 | Sekine | F16D 41/125 |
| | | | 192/46 |
| 9,151,345 B2 | 10/2015 | Showalter | |
| 2007/0199785 A1* | 8/2007 | Lane | F16D 41/125 |
| | | | 192/42 |
| 2014/0110207 A1* | 4/2014 | Davis | F16D 41/08 |
| | | | 192/45.1 |

* cited by examiner

*Primary Examiner* — Colby M Hansen
(74) *Attorney, Agent, or Firm* — Oliff PLC

(57) ABSTRACT

An engaging device includes: inner and outer rings as two rotating elements; and an engaging piece, between the rings, projecting in a radial direction. Further, the engaging piece is attached to one of the rotating elements and another rotating element serves as an engaged member and movable in an axial direction, the engaging piece includes a first inclined portion in a tip end of a surface facing the another rotating element, the another rotating element includes a tapered portion, in a portion coming into contact with the first inclined portion, and in accordance with a position of the another rotating element, a state is switched between a one-way clutch state and a free state.

6 Claims, 13 Drawing Sheets

ENGAGING DEVICE

CROSS-REFERENCE TO RELATED APPLICATION(S)

The present application claims priority to and incorporates by reference the entire contents of Japanese Patent Application No. 2018-001384 filed in Japan on Jan. 9, 2018.

BACKGROUND

The present disclosure relates to an engaging device.

U.S. Pat. No. 9,151,345 discloses an engaging device including an engaging piece which projects radially so as to switch between a state in which the engaging piece can mesh with an engaged member and a state in which the engaging piece cannot mesh with the engaged member. In the engaging device, a state is switched between the state in which the engaging piece can mesh and the state in which the engaging piece cannot mesh in accordance with a rotation of a selector member, coupled with an actuator, in a circumferential direction.

However, in the configuration disclosed in U.S. Pat. No. 9,151,345, since one of the engaged members is a fixed member, the engaging device can serve as a brake but cannot serve as a clutch. In the clutch, two members to be engaged with each other are rotating elements. Therefore, it is difficult to make a structure in which a main body of the actuator is fixed a clutch.

SUMMARY

There is a need for providing an engaging device including an engaging piece which projects radially and capable of serving as a clutch.

An engaging device includes: an inner ring and an outer ring serving as two rotating elements rotating around a same rotational central axis; and an engaging piece, provided between the inner ring and the outer ring, projecting in a radial direction. Further, the engaging piece is attached to one of the rotating elements out of the inner ring and the outer ring so as to rotate integrally and another rotating element serves as an engaged member with which the engaging piece is engaged and as a moving member movable in an axial direction, the engaging piece includes a first inclined portion, inclined with respect to the axial direction, in a tip end of a surface facing the another rotating element in the radial direction, the another rotating element includes a tapered portion, inclined with respect to the axial direction, in a portion coming into contact with the first inclined portion, and in accordance with a position in the axial direction of the another rotating element, a state is switched between a one-way clutch state, in which a rotational direction is limited to one direction in which the inner ring and the outer ring are relatively rotatable, and a free state, in which the inner ring and the outer ring are freely rotatable.

DETAILED DESCRIPTION

An engaging device according to an embodiment of the present disclosure is hereinafter described in more detail with reference to the accompanying drawings.

Figure 1:
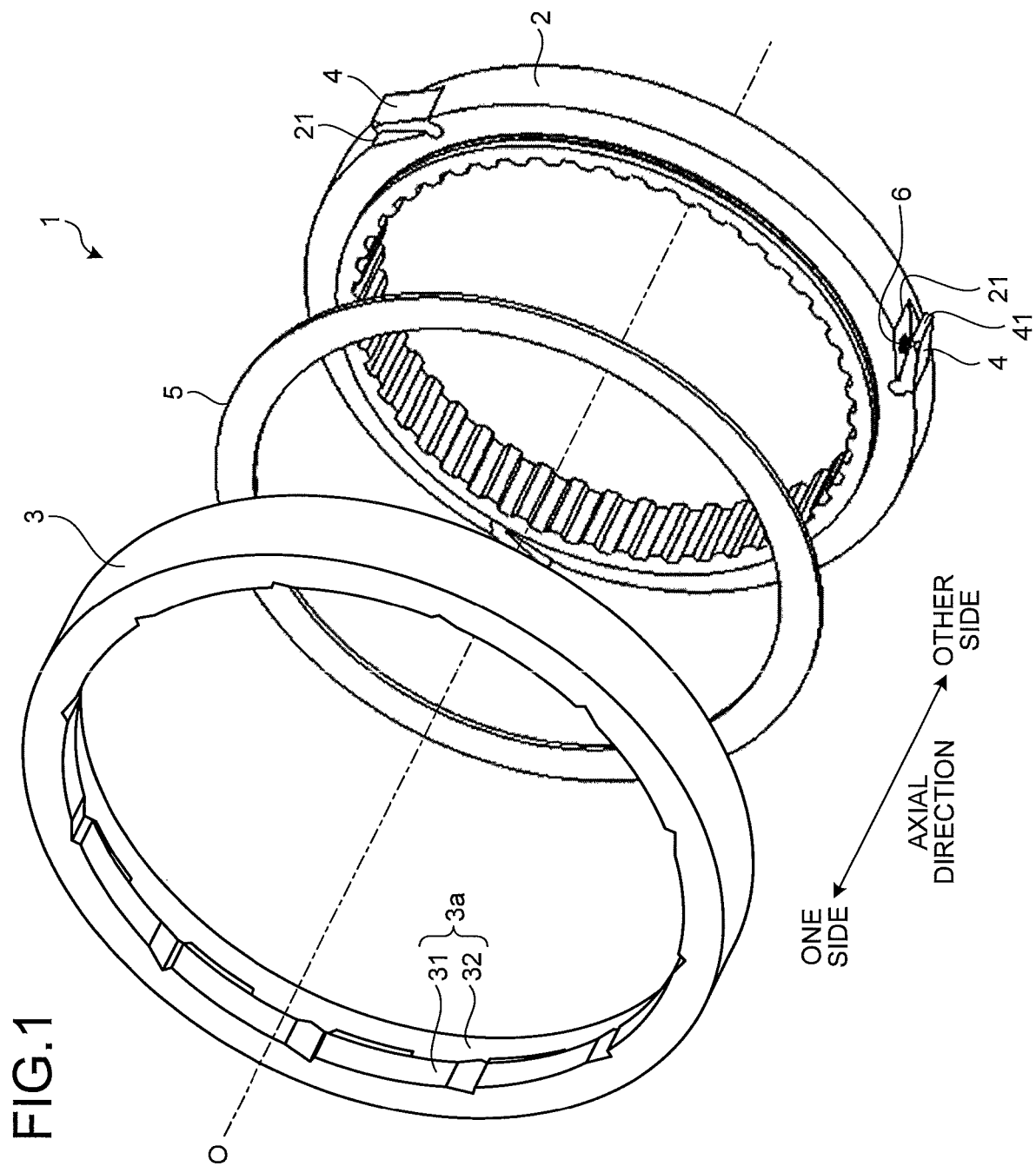
FIG. 1 is an exploded view illustrating an engaging device according to an embodiment.

FIG. 1 is an illustrative view schematically illustrating an engaging device 1 according to an embodiment. The engaging device 1 is provided with an inner ring 2 as a first rotating element, an outer ring 3 as a second rotating element, an engaging piece 4, and a snap ring 5. In the engaging device 1, the inner ring 2 and the outer ring 3 rotating around the same rotational central axis O can be engaged with each other by means of the engaging piece 4 so as to rotate integrally. Note that a direction along the rotational central axis O is herein referred to as an axial direction.

The inner ring 2 is an annular rotating member integrally rotating with the engaging piece 4. An accommodating unit 21 which accommodates the engaging piece 4 is formed on an outer periphery of the inner ring 2. A plurality of accommodating units 21 is provided at predetermined intervals in a circumferential direction. A spring 6 which biases the engaging piece 4 is provided within the accommodating unit 21 in addition to the engaging piece 4. The engaging piece 4 in the accommodating unit 21 is provided in a manner such that a tip end 41 thereof is pushed radially outward by the spring 6 to stand, and the movement of the engaging piece 4 in the axial direction is limited by the snap ring 5 so as not to drop off in the axial direction. The snap ring 5 is attached to the inner ring 2. Spline teeth are provided on an inner periphery of the inner ring 2.

The outer ring 3 is an annular rotating member located outside the inner ring 2 in a radial direction and is a moving member movable in the axial direction by a linear actuator 7 (illustrated in FIG. 7) to be described below. The outer ring 3 and the inner ring 2 are arranged in positions overlapping in the axial direction, and an inner periphery 3a of the outer ring 3 and the outer periphery of the inner ring 2 are opposed to each other in the radial direction. The inner periphery 3a of the outer ring 3 is divided into two areas having different functions on one side and the other side in the axial direction. The inner periphery 3a is such that the one side in the axial direction is formed of a first inner peripheral surface 31 which is an engageable area (One-Way Clutch (OWC) area) and the other side in the axial direction is formed of a second inner peripheral surface 32 which is an area not engageable (free area).

Figure 2:
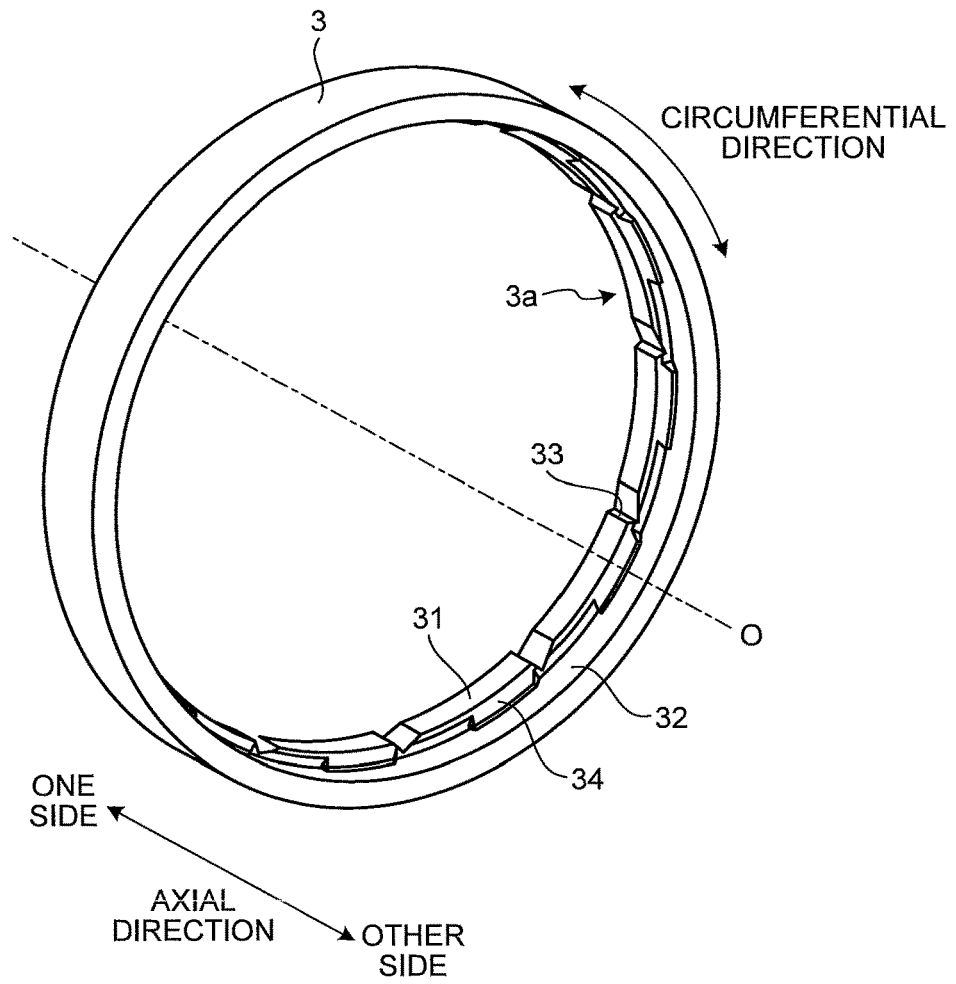
FIG. 2 is a perspective view illustrating an inner periphery of an outer ring.
Figure 3:
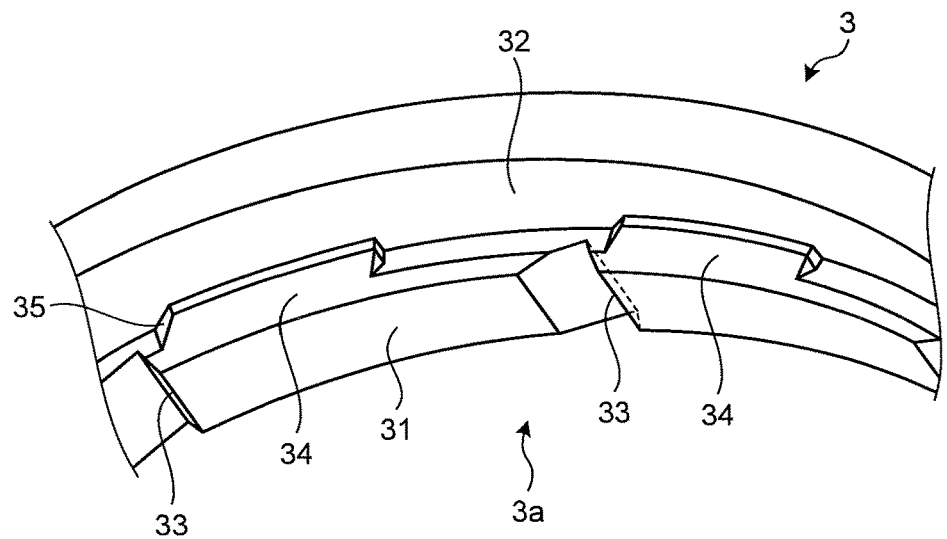
FIG. 3 is an enlarged schematic diagram illustrating the inner periphery of the outer ring.

As illustrated in FIGS. 2 and 3, the first inner peripheral surface 31 which is the OWC area is the inner periphery 3a formed to have a relatively small diameter and is provided with an engaging unit 33 to be engaged with the engaging piece 4. A plurality of engaging units 33 each having a shape in which a part of the first inner peripheral surface 31 is recessed radially outward is provided at predetermined intervals in the circumferential direction. A second inner peripheral surface 32 which is the free area is the inner periphery 3a formed to have a relatively large diameter and is formed into a cylindrical shape over an entire area in the circumferential direction. A tapered portion 34 inclined with respect to the axial direction is provided at a boundary between the first inner peripheral surface 31 and the second inner peripheral surface 32. The first inner peripheral surface 31 of the small diameter and the second inner peripheral surface 32 of the large diameter are connected to each other via the tapered portion 34 having an inclined surface. The tapered portion 34 having the inclined surface in which a corner of a stepped portion is chamfered is provided with a predetermined length in the circumferential direction. For example, a position in a circumferential direction of the tapered portion 34 is different from a position in the circumferential direction of the engaging unit 33. The tapered portion 34 is the inclined surface which comes into contact with a first inclined portion 43 (illustrated in FIG. 4 and the like) of the engaging piece 4.

The engaging piece 4 is a plate-shaped movable member which engages with the outer ring 3. The engaging piece 4 is such that the tip end 41 projects radially outward while being attached to the accommodating unit 21 of the inner ring 2. A plurality of engaging pieces 4 is arranged such that the tip ends 41 are oriented in the same direction in the circumferential direction. Since the tip end 41 projects radially outward from the accommodating unit 21 by means of the spring 6, the engaging piece 4 serves as a claw member which meshes in the circumferential direction.

Figure 4:
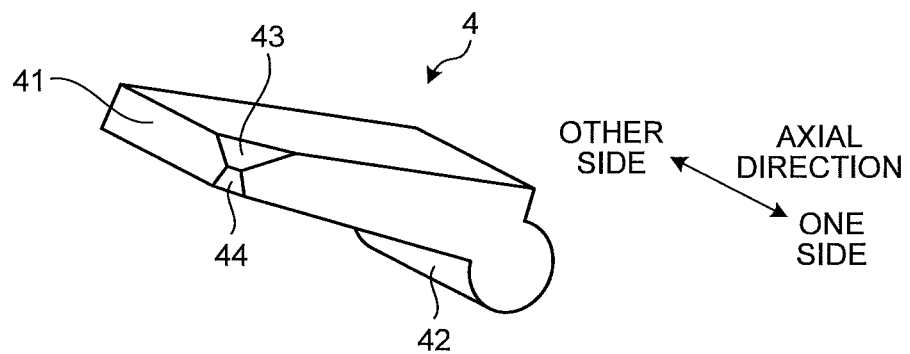
FIG. 4 is a schematic diagram illustrating an engaging piece.
Figure 5:
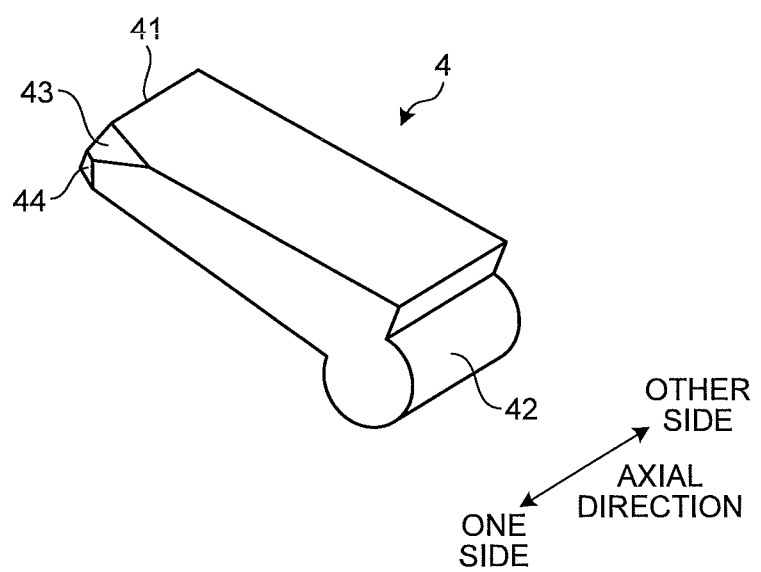
FIG. 5 is a schematic diagram illustrating the engaging piece.

As illustrated in FIGS. 4 and 5, the engaging piece 4 includes the tip end 41, a fulcrum shaft portion 42, a first inclined portion 43, and a second inclined portion 44. The tip end 41 includes an engaging surface engaging with the engaging unit 33 of the outer ring 3. The fulcrum shaft portion 42 being a portion serving as a fulcrum when the tip end 41 swings is held within the accommodating unit 21. Each of the first inclined portion 43 and the second inclined portion 44 includes an inclined surface obtained by chamfering a corner on a side of the tip end 41 of the engaging piece 4. The first inclined portion 43 is an inclined portion obtained by chamfering a corner on the side of the tip end 41 and one side in the axial direction of the surface opposed to the outer ring 3 in the radial direction (radially outer surface). The second inclined portion 44 is an inclined portion obtained by chamfering a corner on the side of the tip end 41 and the one side in the axial direction of the surface opposed to the inner ring 2 in the radial direction (radially inner surface).

Figure 6:
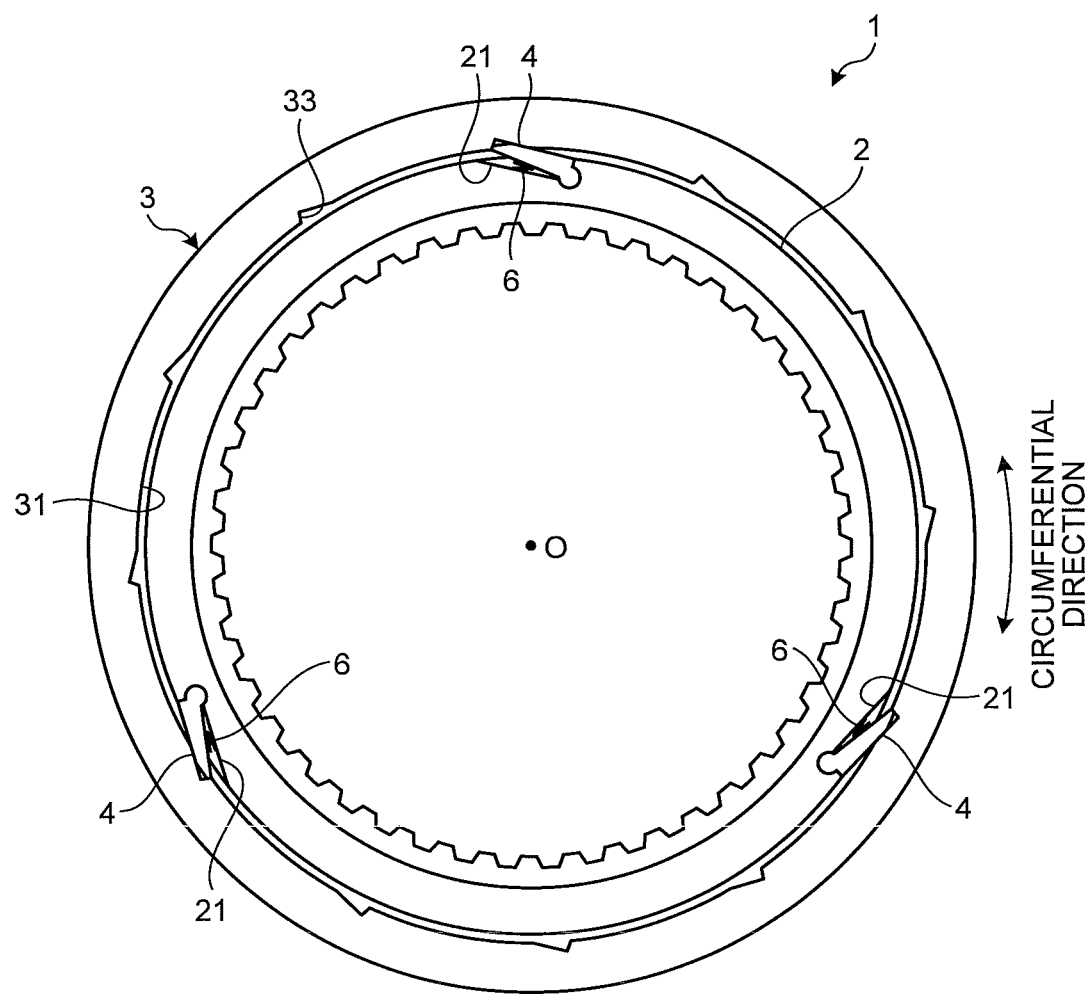
FIG. 6 is a side view schematically illustrating the engaging device when viewed from one side in an axial direction.

As illustrated in FIG. 6, the engaging device 1 is provided in a manner such that the outer ring 3 is movable in the axial direction in a state where the inner ring 2 and the outer ring 3 are arranged in positions opposed to each other in the radial direction. The engaging device 1 can be switched between a one-way clutch state (hereinafter referred to as an "OWC state") with the rotational direction limited to one direction in which the inner ring 2 and the outer ring 3 are relatively rotatable, and a bidirectional free state (hereinafter, referred to as a "free state") in which the inner ring 2 and the outer ring 3 can freely rotate without any limitation in the rotational directions of the inner ring 2 and the outer ring 3. In the OWC state, the engaging piece 4 is engageable with the engaging unit 33. On the other hand, in the free state, the engaging piece 4 cannot be engaged with the engaging unit 33.

Figure 7:
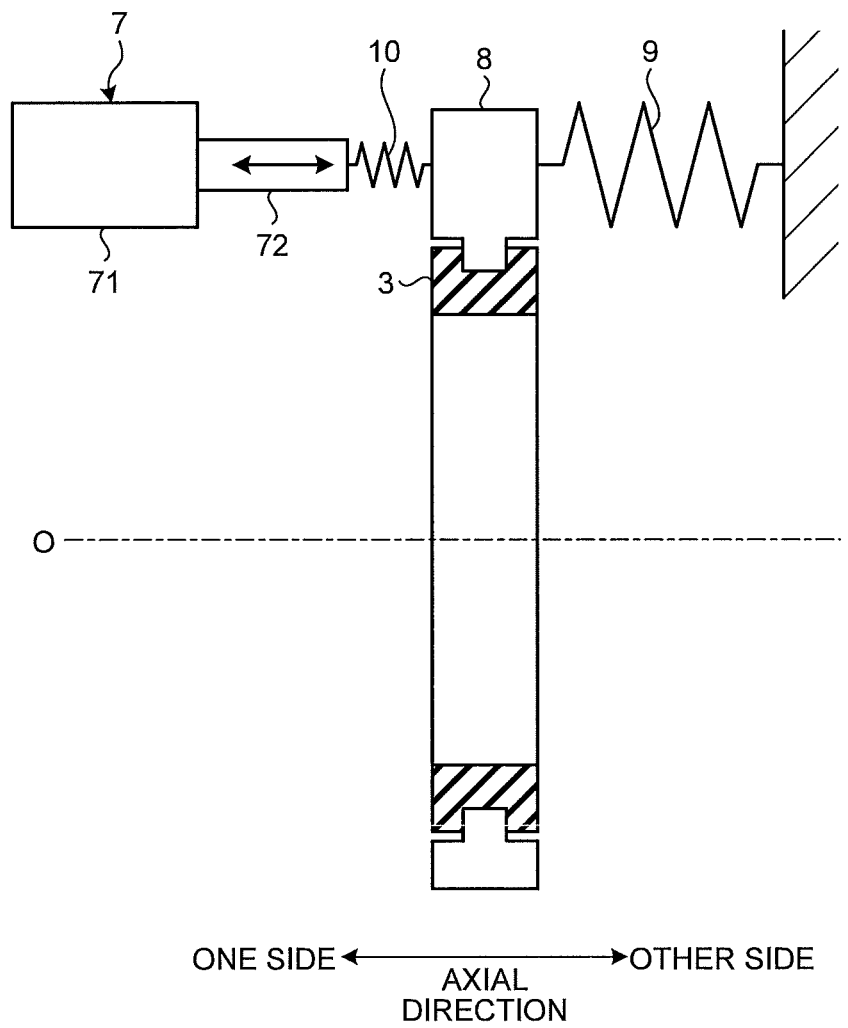
FIG. 7 is an illustrative view schematically illustrating a configuration including a linear actuator.

Herein, the linear actuator 7 is described with reference to FIG. 7. As illustrated in FIG. 7, the outer ring 3 is mechanically coupled with the linear actuator 7 via a shift fork 8. A return spring 9 is connected to the shift fork 8. The return spring 9 generates a force (biasing force) to bias the shift fork 8 toward the linear actuator 7. The linear actuator 7 is provided with a main body 71 fixed to a fixing member such as a case and a movable piece 72 which moves in the axial direction. The movable piece 72 projects in the axial direction from the main body 71 and is mechanically coupled with the shift fork 8 via a waiting spring 10. When the position in the axial direction of the outer ring 3 changes, the engaging device 1 switches between the free state (refer to FIG. 8) and the OWC state (refer to FIG. 9). In both the free state and the OWC state, the outer ring 3 is disposed in the position in the axial direction facing the inner ring 2 in the radial direction. Note that the linear actuator 7 may be any of a hydraulic type, an electric motor, an electromagnetic type or the like. In the engaging device 1 according to this embodiment, only the outer ring 3 is movable in the axial direction. A movement of the outer ring 3 from one side to the other side in the axial direction as illustrated in FIG. 7 is herein refers to as a stroke. At the time of the stroke of the outer ring 3, the outer ring 3 is moved to the other side in the axial direction against the biasing force of the return spring 9.

Figure 8:
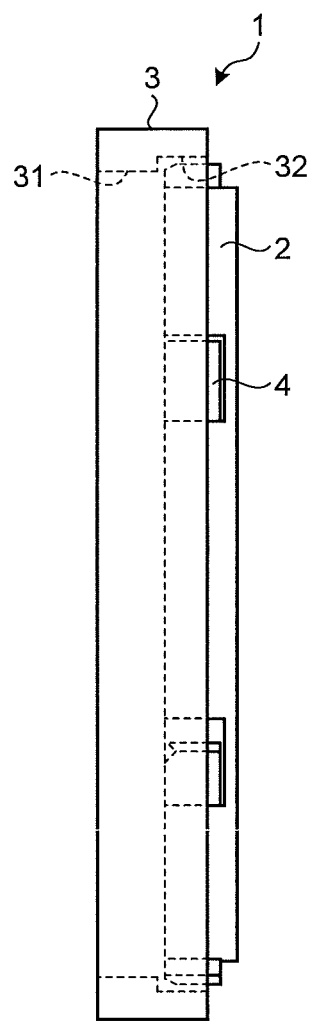
FIG. 8 is a schematic diagram illustrating a position in the axial direction of the outer ring in a free state.

As illustrated in FIG. 8, in the free state, the position in the axial direction of the outer ring 3 is such that the second inner peripheral surface 32 faces the inner ring 2 but the first inner peripheral surface 31 does not face the inner ring 2. In this case, since the engaging piece 4 cannot be engaged with the second inner peripheral surface 32, it becomes the free state in which the inner ring 2 and the outer ring 3 can be freely rotate with respect to each other.

Figure 9:
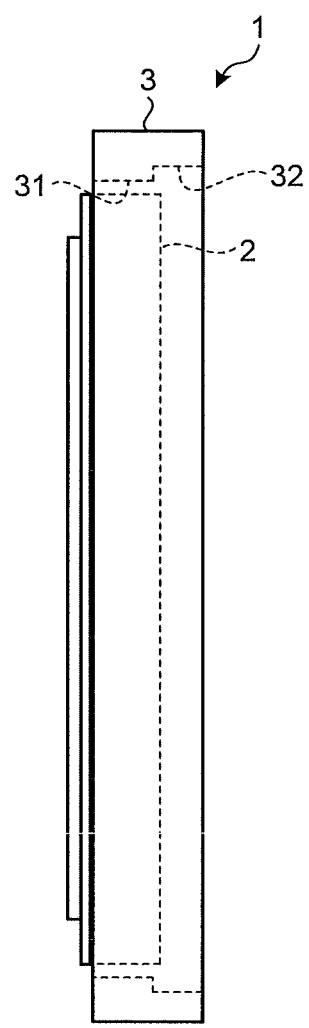
FIG. 9 is a schematic diagram illustrating the position in the axial direction of the outer ring in a one-way clutch state.

As illustrated in FIG. 9, in the OWC state, the outer ring 3 in the axial direction is disposed at a position in which the first inner peripheral surface 31 faces the inner ring 2. In this case, since the first inner peripheral surface 31 is an engaging surface including the engaging unit 33 with which the engaging piece 4 can engage, it becomes the OWC state in which the inner ring 2 and the outer ring 3 may engage with each other.

Figure 10:
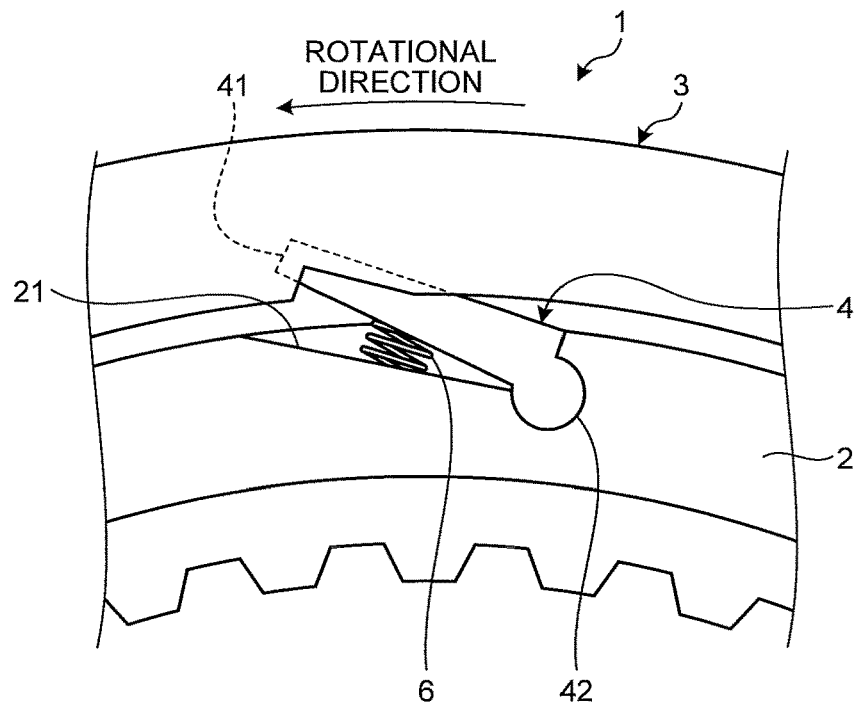
FIG. 10 is an enlarged schematic diagram illustrating the engaging device in the free state.
Figure 11:
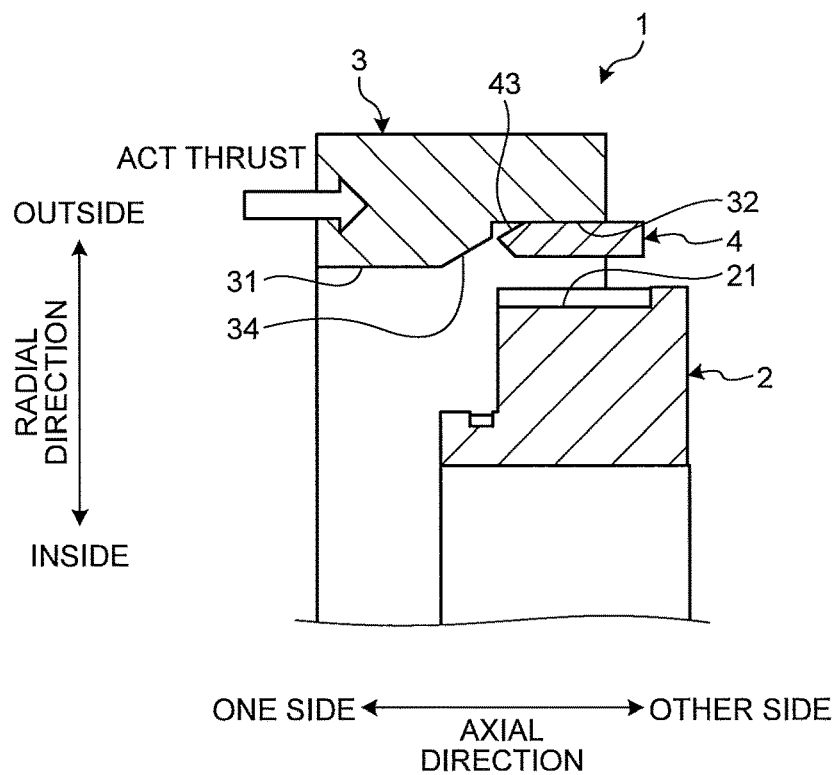
FIG. 11 is a cross-sectional view illustrating a case where the outer ring is stroked in the axial direction in the free state.

FIG. 10 is an enlarged schematic diagram illustrating the engaging device 1 in the free state. FIG. 11 is a cross-sectional view illustrating a case of stroking the outer ring 3 in the axial direction in the free state. In the free state, the engaging piece 4 is in a standing state projecting radially outward and the outer ring 3 is rotatable in both directions. Note that FIG. 10 illustrates a case where the engaging device 1 is seen from the one side to the other side in the axial direction.

As illustrated in FIG. 10, in a case where the outer ring 3 rotates in the direction from the fulcrum shaft portion 42 toward the tip end 41 side of the engaging piece 4, the engaging device 1 can be in an overrun state. The overrun state herein refers to a state in which the outer ring 3 to be engaged can rotate over the engaging piece 4. In this case, for example, when the inner ring 2 stops rotating, a state in which the outer ring 3 rotates from the fulcrum shaft portion 42 side toward the tip end 41 side of the engaging piece 4 is the overrun state. When the inner ring 2 and the outer ring 3 rotate, the overrun state can be defined by a relationship between the rotational direction and a rotational speed (rotational rate). Specifically, when the tip end 41 side of the engaging piece 4 is forward in the rotational direction of the inner ring 2 and the outer ring 3, the overrun state occurs when the rotational rate of the outer ring 3 is higher than the rotational rate of the inner ring 2. When the rotational direction is opposite to this, that is, that is, when the fulcrum shaft portion 42 side of the engaging piece 4 is forward in the rotational direction of the inner ring 2 and the outer ring 3, the overrun state occurs when the rotational rate of the inner ring 2 is higher than the rotational rate of the outer ring 3. Then, in the overrun state, switching control by the linear actuator 7 is performed, and switching operation from the free state to the OWC state is performed.

Figure 12:
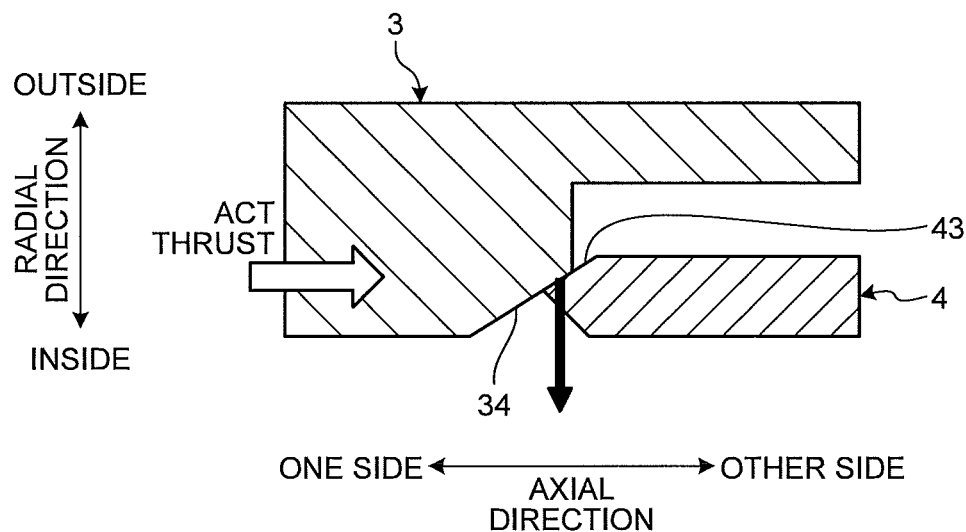
FIG. 12 is a cross-sectional view illustrating a state where a tapered portion of the outer ring comes into contact with a first inclined portion of the engaging piece.
Figure 13:
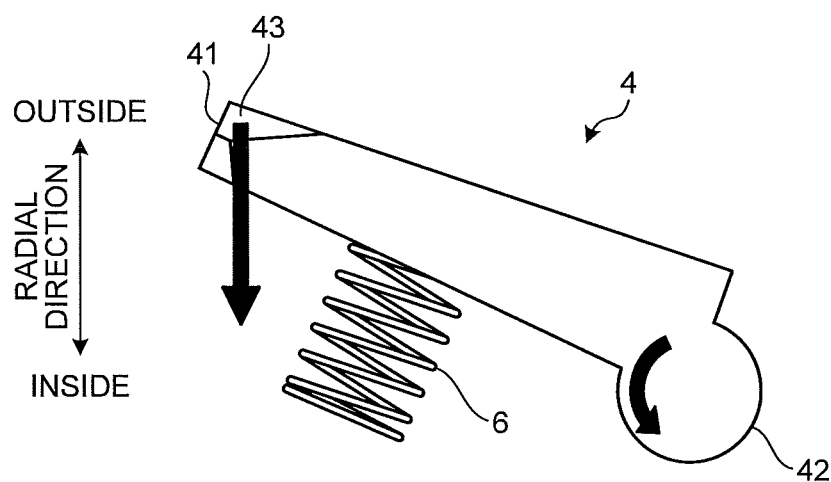
FIG. 13 is a schematic diagram illustrating where a tip end of the engaging piece is depressed radially inward by a force acting on the first inclined portion.
Figure 14:
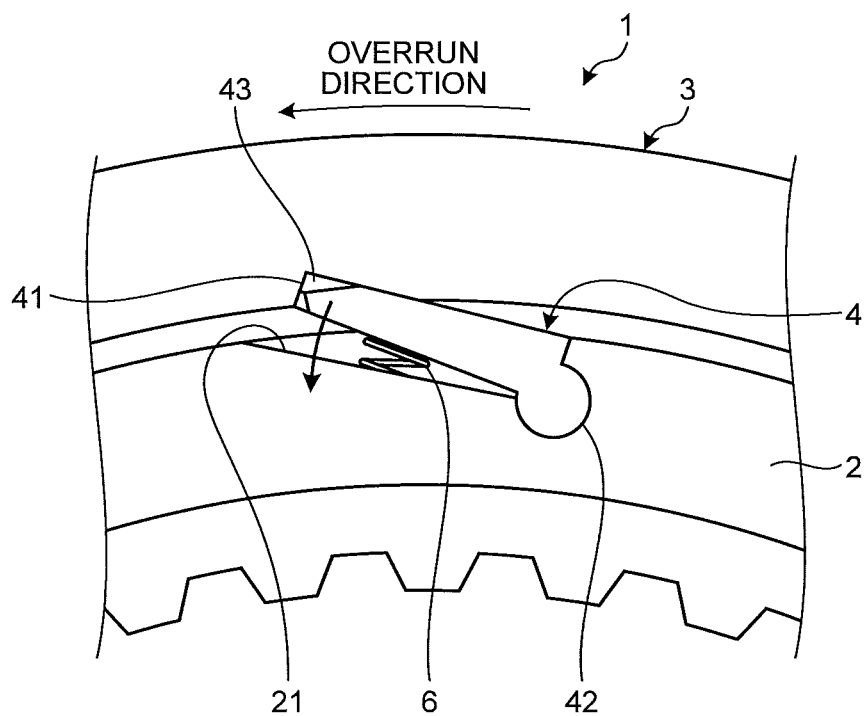
FIG. 14 is a schematic diagram illustrating an overrun state.

As illustrated in FIG. 11, at the time of the switching operation from the free state to the OWC state, thrust (ACT thrust) which is an axial direction load acts on the outer ring 3 from the linear actuator 7 and the outer ring 3 moves toward the other side in the axial direction so as to approach the engaging piece 4 side. In this case, the tapered portion 34 of the outer ring 3 comes into contact with the first inclined portion 43 of the engaging piece 4. As illustrated in FIG. 12, when the tapered portion 34 comes into contact with the first inclined portion 43, a force directed inward in the radial direction acts on the engaging piece 4. Since both a contact surface of the tapered portion 34 and a contact surface of the first inclined portion 43 are inclined with respect to the axial direction, the ACT thrust of the outer ring 3 is decomposed (changed) into components including a radial component (depressing component force) and acts on the engaging piece 4. As illustrated in FIG. 13, the radial component refers to a force pushing down the tip end 41 of the engaging piece 4 radially inward. By operating the linear actuator 7 in the overrun state to switch from the free state to the OWC state, it is possible to push down the tip end 41 side of the engaging piece 4 by the ACT thrust, so that it becomes possible to stroke the outer ring 3 in the axial direction without requiring a phase synchronization. As illustrated in FIG. 14, when the outer ring 3 rotates in the overrun direction, a force to lay the tip end 41 of the engaging piece 4 on the accommodating unit 21 side can act on the engaging piece 4 from the outer ring 3.

Figure 15:
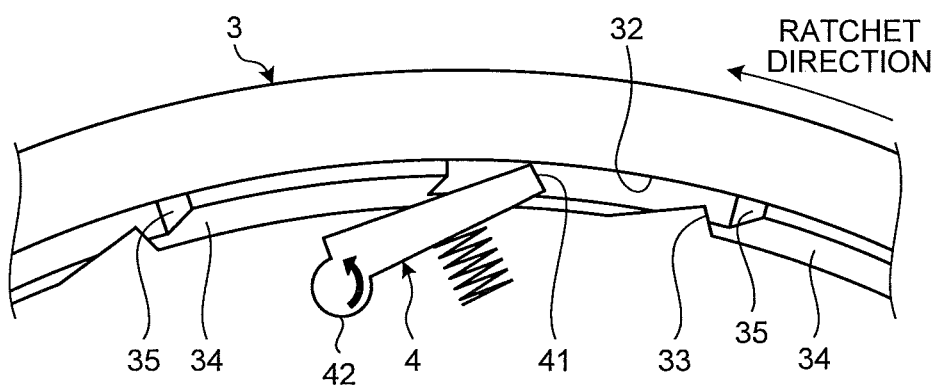
FIG. 15 is a schematic diagram illustrating a ratchet state.

FIG. 15 is a schematic diagram illustrating a ratchet state. Note that FIG. 15 illustrates a case where the engaging device 1 is seen from the other side in the axial direction.

As illustrated in FIG. 15, in the free state, there may be a case where the outer ring 3 rotates in the direction toward the tip end 41 side of the engaging piece 4 (a ratchet direction). In the free state, when the outer ring 3 rotates in the ratchet direction, the engaging piece 4 comes into contact with the second inner peripheral surface 32. In the ratchet direction, it is possible to suppress the stroke of the outer ring 3 at a predetermined rotational rate or higher. For example, when the inner ring 2 stops rotating, a state in which the outer ring 3 rotates from the tip end 41 side to the fulcrum shaft portion 42 side of the engaging piece 4 is the ratchet state. When the fulcrum shaft portion 42 side of the engaging piece 4 is forward in the rotational direction of the inner ring 2 and the outer ring 3, it becomes the ratchet state if the rotational rate of the outer ring 3 is higher than the rotational rate of the inner ring 2. When the rotational direction is opposite to this direction, that is, when the tip end 41 side of the engaging piece 4 is forward in the rotational direction of the inner ring 2 and the outer ring 3, it becomes the ratchet state if the rotational rate of the inner ring 2 is higher than the rotational rate of the outer ring 3. In the free state, when the outer ring 3 rotates in the ratchet direction, there may be a case where the outer ring 3 is bounced off the engaging piece 4 in the axial direction.

Figure 16:
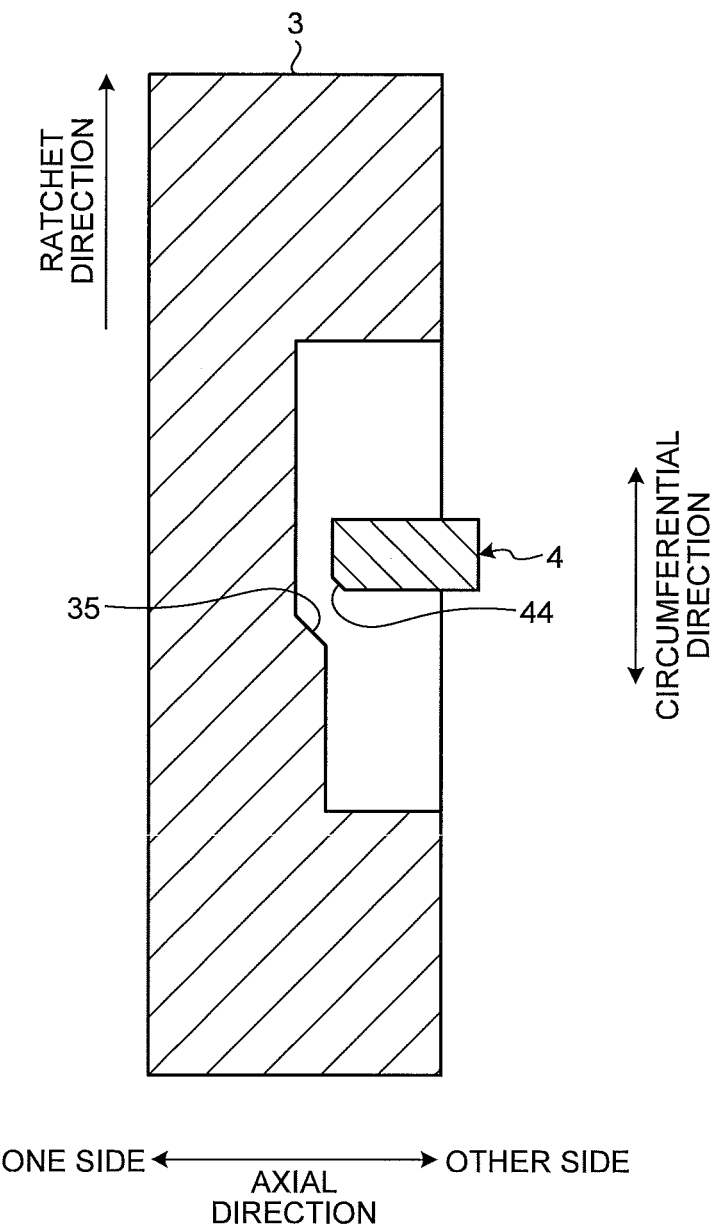
FIG. 16 is a cross-sectional view illustrating the ratchet state.
Figure 17:
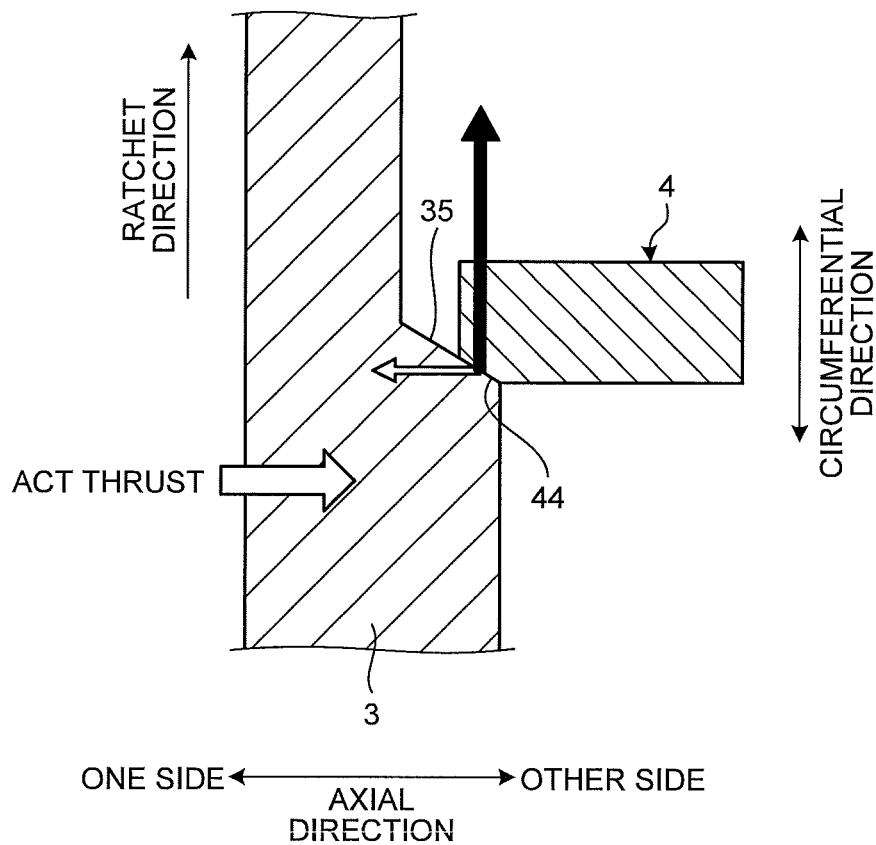
FIG. 17 is a cross-sectional view illustrating that an inclined portion of the outer ring and a second inclined portion of the engaging piece come into contact with each other when rotating in the ratchet direction.
Figure 18:
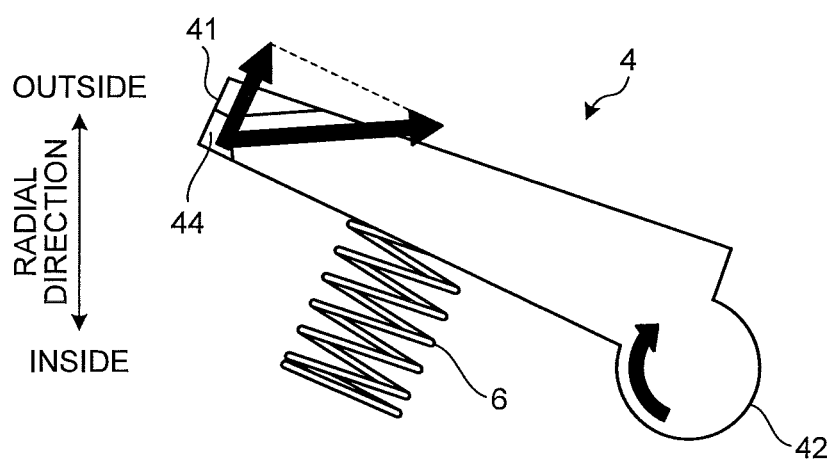
FIG. 18 is a schematic diagram illustrating that a force in a direction in which the engaging piece stands is generated by a force acting on the second inclined portion.
Figure 19:
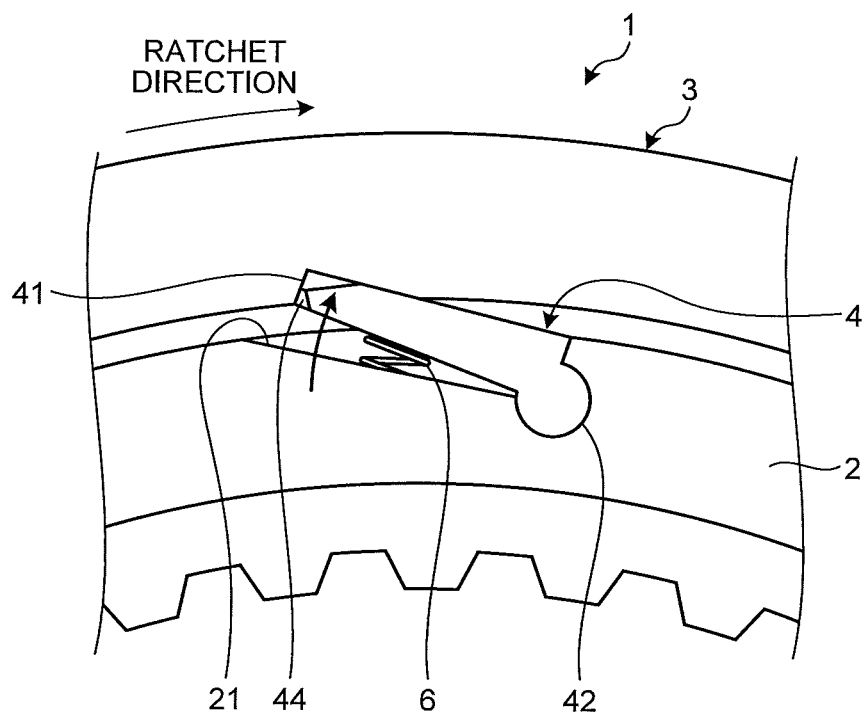
FIG. 19 is a schematic diagram illustrating the ratchet state.

As illustrated in FIG. 16, in the free state, when the outer ring 3 rotates in the ratchet direction, an inclined portion 35 of the outer ring 3 faces the second inclined portion 44 of the engaging piece 4. Then, as illustrated in FIG. 17, in the ratchet state, when the outer ring 3 moves toward the other side in the axial direction by the ACT thrust, the inclined portion 35 comes into contact with the second inclined portion 44. In this case, by a circumferential direction load (torque) acting on the engaging piece 4 from the outer ring 3, a reaction force (component force against stroke), acting in the direction opposite to the direction of the ACT thrust, acts on the outer ring 3. Due to the reaction force in the axial direction, the outer ring 3 is bounced off to the side opposite to a stroke direction. When the rotational rate of the outer ring 3 is high, the outer ring 3 is bounced off to the side opposite to the stroke direction by the second inclined portion 44 which is the chamfered end face of the engaging piece 4. Therefore, it is possible to prevent the stroke (prevent quick engagement) in the ratchet state. Furthermore, as illustrated in FIGS. 18 and 19, in the ratchet state, a force is generated that raises the tip end 41 of the engaging piece 4 radially outward due to the circumferential direction load acting on the second inclined portion 44 from the inclined portion 35. That is, even when the inclined portion 35 comes into contact with the engaging piece 4, it is possible to maintain the standing state of the engaging piece 4, so that the ratchet state can be maintained. Note that, in the ratchet state, when the outer ring 3 is bounced off the engaging piece 4, the outer ring 3 can be bounced off (displaced in the axial direction) to the direction opposite to the stroke direction as the waiting spring 10 contracts.

As described above, according to the embodiment, the engaging device 1 including the engaging piece 4 projecting in the radial direction can act as a clutch. Also, in the structure in which the outer ring 3 is moved in the axial direction by the linear actuator 7, it is possible to selectively switch between the OWC state and the free state. When switching from the free state to the OWC state, by stroking the outer ring 3 in the overrun state, the tapered portion 34 can come into contact with the first inclined portion 43 to push down the engaging piece 4 radially inward. This eliminates the necessity of phase synchronization, so that a responsiveness in switching between the free state and the OWC state is improved.

Also, by attaching the engaging piece 4 to the inner ring 2, the engaging piece 4 can stand by a centrifugal force, so that meshing with the outer ring 3 is more surely performed.

Note that, as a modified embodiment, the accommodating unit 21 and the engaging piece 4 of the inner ring 2 may have a structure of limiting a standing angle of the engaging piece 4. In this case, the engaging piece 4 and the second inner peripheral surface 32 may not necessarily be in contact with each other in the free state. As an example, a rear end of the engaging piece 4 comes into contact with a wall surface of the accommodating unit 21 to be formed to have a structure of limiting the standing of the engaging piece 4. As a result, in the free state, since the engaging piece 4 and a cylindrical surface on an inner peripheral side of the outer ring 3 are not in contact with each other, an occurrence of drag loss due to sliding of the outer ring 3 with the engaging piece 4 can be suppressed, and power loss can be reduced accordingly.

According to an embodiment, when switching from the free state to the one-way clutch state, the tapered portion pushes down the inclined portion radially inward, so that switching operation can be performed without requiring a phase synchronization. Therefore, switching responsiveness is improved.

According to an embodiment, when switching from the free state to the one-way clutch state, the tapered portion provided between the first inner peripheral surface and the second inner peripheral surface can come into contact with the first inclined portion of the engaging piece to push down the tip end of the engaging piece radially inward, so that the phase synchronization is no longer necessary. This improves the responsiveness of the switching operation.

According to an embodiment, it is possible to stroke the outer ring in the axial direction in an overrun state. As a result, since the tapered portion comes into contact with the inclined portion, it is possible to switch without requiring the phase synchronization and the responsiveness of the switching operation is improved.

According to an embodiment, since the outer ring is bounced off to the direction opposite to a stroke direction by the second inclined portion of the engaging piece, it is possible to suppress a rapid engagement of the engaging piece with the outer ring when a rotational rate of the outer ring is high.

According to an embodiment, an occurrence of drag loss due to sliding of the outer ring with the engaging piece in the free state can be suppressed, and a power loss can be reduced accordingly.

In the present disclosure, since the engaging piece and the engaging surface include the tapered portion, the engaging piece is automatically pushed down in an overrun direction. Therefore, when the state transits from an opened state to an engaged state, it is not necessary to synchronously rotate the engaging piece and the engaging surface of the rotating element. Therefore, deterioration in responsiveness from the opened state to the engaged state may be suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An engaging device comprising:
    an inner ring and an outer ring serving as two rotating elements rotating around a same rotational central axis; and
    an engaging piece, provided between the inner ring and the outer ring, configured to project in a radial direction,
    wherein the engaging piece is attached to one of the rotating elements out of the inner ring and the outer ring so as to rotate integrally and another rotating element serves as an engaged member with which the engaging piece is engaged and as a moving member movable in an axial direction,
    the engaging piece includes a first inclined portion, inclined with respect to the axial direction, in a tip end of a surface facing the another rotating element in the radial direction,
    the another rotating element includes a tapered portion, inclined with respect to the axial direction, in a portion coming into contact with the first inclined portion, and
    in accordance with a position in the axial direction of the another rotating element, a state is switched between a one-way clutch state, in which a rotational direction is limited to one direction in which the inner ring and the outer ring are relatively rotatable, and a free state, in which the inner ring and the outer ring are freely rotatable.

2. The engaging device according to claim 1,
    wherein the inner ring includes an accommodating unit to which the engaging piece is attached,
    the engaging piece is a plate-shaped member attached to the accommodating unit and is a movable member for transiting between a standing state, in which a tip end thereof projects radially outward from the accommodating unit while a rear end thereof is kept accommodated in the accommodating unit, and a state in which the tip end lies, and
    when the outer ring moves in the axial direction to switch from the free state to the one-way clutch state, the tapered portion comes into contact with the first inclined portion and pushes down the tip end of the engaging piece radially inward.

3. The engaging device according to claim 2,
    wherein an inner periphery of the outer ring includes
        a first inner peripheral surface, provided on one side in the axial direction, configured to engage with the engaging piece, and
        a second inner peripheral surface, provided on another side in the axial direction, which does not engage with the engaging piece,
    the second inner peripheral surface is a cylindrical surface having a larger diameter than a diameter of the first inner peripheral surface, and
    the tapered portion is provided between the first inner peripheral surface and the second inner peripheral surface.

4. The engaging device according to claim 2, further comprising:
    an actuator configured to move the outer ring in the axial direction,
    wherein, when the outer ring rotates from the rear end toward the tip end of the engaging piece, the actuator moves the outer ring in the axial direction to switch from the free state to the one-way clutch state.

5. The engaging device according to claim 2,
    wherein the engaging piece includes a second inclined portion inclined with respect to the axial direction on a surface facing the outer ring in the rotational direction in the free state,
    the outer ring includes an inclined portion inclined with respect to the axial direction in a portion facing the engaging piece in the rotational direction in the free state, and
    the inclined portion comes into contact with the second inclined portion in the free state and the outer ring is bounced off the engaging piece in the axial direction.

6. The engaging device according to claim 2,
wherein the engaging piece is not in contact with a cylindrical surface on an inner peripheral side of the outer ring in the free state.

* * * * *